United States Patent [19]

Shook, Jr.

[11] 3,884,997

[45] May 20, 1975

[54] PROCESS FOR PREPARATION OF AROMATIC PHOSPHORUS COMPOUNDS
[75] Inventor: Howard E. Shook, Jr., Orange, Tex.
[73] Assignee: E. I. du Pont de Nemours and Company, Wilmington, Del.
[22] Filed: May 2, 1973
[21] Appl. No.: 356,444

[52] U.S. Cl. ............... 260/973; 260/976; 260/990
[51] Int. Cl. .......... C07f 9/08; C07f 9/32; C07f 9/40
[58] Field of Search..................... 260/973, 976, 990

[56] References Cited
UNITED STATES PATENTS

| | | | |
|---|---|---|---|
| 2,220,845 | 11/1940 | Moyle | 260/976 X |
| 2,880,223 | 3/1959 | Coates et al. | 260/976 X |
| 3,287,449 | 11/1966 | Baranauckas et al. | 260/976 |
| 3,335,204 | 8/1967 | Scherer et al. | 260/976 |

*Primary Examiner*—Lorraine A. Weinberger
*Assistant Examiner*—Richard L. Raymond

[57] ABSTRACT

An improved process is provided for the preparation of aromatic phosphorus compounds such as phosphite, phosphonite or phosphinite through reaction of a phenol or phenolic compound with the appropriate phosphorus halide by incorporating a finely-divided metal in the reaction medium in the final stages of reaction to produce an aromatic phosphorus compound free of by-product hydrogen halide.

6 Claims, No Drawings

PROCESS FOR PREPARATION OF AROMATIC PHOSPHORUS COMPOUNDS

BACKGROUND OF THE INVENTION

It is well known to prepare aromatic phosphorus compounds such as aryl phosphites, aryl phosphonites or aryl phosphinites by reaction of a phenol or phenolic compound with the appropriate trivalent phosphorus halide such as a chloride, bromide or iodide. In such a process a by-product of the reaction is hydrogen halide. Difficulty is experienced in removing this material from the desired reaction product and even a distilled product may contain small amounts of this material. The result of this is especially important in situations wherein the end products such as triaryl phosphites are to be used as components in various catalyst systems such as those employed in hydrocyanation of olefins as described in U.S. Pat. Nos. 3,496,215, 3,496,217 and 3,496,218 and in isomerization of nitriles as described in U.S. Pat. No. 3,536,748.

The use of vacuum to complete the reaction and employment of an entraining gas to facilitate removal of hydrogen halide is described in U.S. Pat. No. 2,193,252. A process of passing the phenol and trivalent phosphorus halide through a zone heated at a temperature about 75° below the boiling point to the boiling point of the phenol to produce a reaction product substantially free of halogen is described in U.S. Pat. No. 3,287,449, and use of small proportions of a catalyst such as metallic magnesium, calcium or aluminum or a chloride of magnesium, aluminum or iron is disclosed in U.S. Pat. No. 2,220,845. Even with such processes as these, small quantities of hydrogen halide may remain in the reaction product and also high temperature preparations in particular may incur degradation of the desired product.

Because of the need for aromatic phosphorus compounds of high purity to insure efficient catalyst performance wherein such phosphorus compounds are components of the catalyst system, still further improved processes for the preparation of these aromatic phosphorus compounds have been sought.

SUMMARY OF THE INVENTION

It has now been found that an aromatic phosphorus compound such as triaryl phosphite, diaryl phosphonite or aryl phosphinite free of residual hydrogen halide can be prepared by incorporating in the reaction mixture comprising a phenol composition and the appropriate phosphorus halide at the final stage of reaction a metal capable of displacing hydrogen from the residual hydrogen halide with formation of the corresponding metal halide. The reaction is ordinarily carried out at a temperature from about 25°C. to the boiling point of the reaction mixture.

As indicated above, the metal preferably in finely-divided form is added to the reaction mixture when the reaction of the phenol with the phosphorus halide is substantially complete. Any metal which is more electropositive than hydrogen in the reaction medium can be used. Operable metals include Mg, Ca, Ba, Sr, Ti, V, Fe, Co, Cu, Cd, Al, Ga, In, Sn, Pb, Zn and Cr. The preferred metals for this purpose are zinc, cadmium, titanium and chromium with zinc being especially preferred. The amount of metal used should be at least a stoichiometric amount based on the amount of hydrogen halide remaining in the reaction product. An excess of metal will normally be used but in general a large excess would be avoided for economic reasons.

After addition of the metal the reaction mixture is maintained at a temperature in the range of 25°C. to the boiling point of the reaction mixture at this stage, essentially the boiling point of the aromatic phosphorus compound. Preferably a temperature in the range of 40°–110°C. is employed. The reaction can be carried out at subatmospheric, atmospheric, or superatmospheric pressures. Operation at atmospheric pressure is convenient and is preferred.

The aromatic phosphorus compound prepared and treated as described above to render it free of by-product hydrogen halide can be isolated by distillation or other suitable means. For many purposes the product after treatment to remove hydrogen halide can be filtered, for example, by vacuum filtration and more intensive rectification treatments are not required. For purposes such as these wherein the aromatic phosphorus compound is to be converted into a catalyst for hydrocyanation, for instance, the metal halide compounds contained therein can function as a catalyst promoter.

The phenolic compounds used for preparing the organic phosphorus compounds may contain from 6 to 25 carbon atoms. Suitable phenolic materials include phenol, o, m or p-cresols, mixtures of m and p-cresol, catechol, o, m or p-cyclohexyl phenols, o, m or p-phenyl phenols, o, m or p-tertiary butyl phenols, p-octyl phenols, p-decyl phenols and p-octadecyl phenols. The phosphorus halides used in the process of the invention may be designated as $R_xPX_{(3-x)}$ where the R is defined as an alkyl or aryl group of one to 18 carbon atoms, X is a halide of the group consisting of chloride, bromide or iodide and $x$ has a value of 0–2. Of the halides the chlorides are preferred. Useful phosphorus halides include the phosphorus trihalides as well as those wherein one or more of the halide atoms is replaced by an alkyl or aryl radical. Especially suitable phosphorus halides include phosphorus trichloride, methylphosphorus dichloride, dimethylphosphorus chloride, methylethyl phosphorus chloride, phenylphosphorus dichloride, diphenyl phosphorus chloride, distearylphosphorus chloride, butylphosphorus dichloride, ethylbenzyl phosphorus chloride and the corresponding bromine compounds.

The organic phosphorus compound obtainable by the process of this invention may be designated by the formula $R_xP(OR')_{(3-x)}$ wherein R and $x$ are as defined above and R' is an aryl radical having 6 to 25 carbon atoms. Typical compounds include triphenyl phosphite, tri-(o-, m- or p-tolyl)phosphites, mixed tri-(m- and p-tolyl)phosphites, tri-(2,5-xylyl)phosphite, tri-(2,4-xylyl)phosphite, di-o-tolyl phenyl phosphite, diphenyl-o-tolyl phosphite, tricyclohexyl phosphite, tri-o-phenylphenyl phosphite, diphenyl phenyl phosphonite and p-tolyl diphenyl phosphinite.

The aromatic phosphorus compounds prepared by the method of this invention are especially useful as components for the catalysts used in hydrocyanation of olefins.

DESCRIPTION OF PREFERRED EMBODIMENTS

The process of this invention is more fully illustrated in the examples to follow. In carrying out these examples the soluble metal concentration was determined by atomic absorption spectroscopy. Ionic halide was determined by titration with silver ion using Aminco automatic titrater (American Instrument Co.). The phenol was analyzed by liquid chromatography.

Examples I to IX illustrate the beneficial effect on residual halide levels from addition of a metal at the final stages of reaction of a phenolic composition with the phosphorus halide. Example X illustrates the improved hydrocyanation results obtained with a catalyst system wherein the aromatic phosphite component is prepared by the process of this invention.

EXAMPLE I

Phosphorus trichloride (60 g., 0.44 mole) was added from a dropping funnel over a 30 minute period to mixed m/p-cresol (135 g., 1.25 mole) at about 25°C. with stirring. The reaction mixture was then heated at 50°C. for 3 hours with nitrogen bubbling through the liquid at 40 ml/min. The off-gas was passed through sodium hydroxide to remove hydrogen chloride. A sample of the product analyzed 6.79 percent cresol and 0.60 percent chloride. The reaction mixture was then heated and stirred at 100°C. for 1 hour while the nitrogen entraining gas remained at 40 ml/min. A sample of the product analyzed 5.81 percent cresol and 0.32 percent chloride. Excess zinc powder (3 g.) was added to the reactor, and the mixture was heated at 100°C. for 30 minutes. The product was collected by vacuum filtration. The tritolyl phosphite mixture analyzed 2.22 percent cresol, 0.28 percent soluble zinc, and 0.33 percent chloride. Within experimental error, the chloride in the phosphite is accounted for as zinc chloride.

EXAMPLE II

Example I was repeated except that the reaction mixture was heated for 4 hours at 50°C. A product sample analyzed 4.00 percent cresol and 0.75 percent chloride. Excess zinc powder (3 g.) was then added to the reactor, and the mixture was heated at 50°C. for 30 minutes. The tritolyl phosphite mixture analyzed 2.16 percent cresol, 0.50 percent chloride and 0.29 percent soluble zinc. Within experimental error, the chloride in the phosphite is accounted for as zinc chloride.

A comparison of Examples I and II shows that addition of zinc powder to the reaction mixture is more effective in removing residual hydrogen chloride than increasing the temperature of the reaction mixture. The preparation is completed in 30 minutes or less after zinc powder is used to react with residual hydrogen chloride.

EXAMPLE III

Example I was repeated except that 0.1 g. zinc powder was present in the mixed m/p-cresol. The reaction mixture was heated at 50°C. for 3 hours and at 100°C. for 1 hour. A product sample analyzed 7.57 percent cresol and 0.48 percent chloride. The zinc concentration was 0.07 percent. Excess zinc powder (3 g.) was added to the reactor, and the mixture was heated at 100°C. for 30 minutes. The reaction mixture analyzed 3.21 percent cresol, 0.23 percent soluble zinc, and 0.18 percent chloride.

Example III shows that the metal powder must be added in the final stage of the reaction to eliminate residual hydrogen chloride.

EXAMPLE IV

A 120 g. sample of mixed m- and p-tritolyl phosphite which contained 0.19 percent residual chloride was treated with excess zinc powder (1.4 g.) for 1 hour at 100°C. The product was collected by vacuum filtration. A sample analyzed 0.22 percent soluble zinc, indicating that substantially all of the chloride was present as zinc chloride.

EXAMPLE V

A 120 g. sample of mixed m- and p-tritolyl phosphite which contained 0.19 percent residual chloride was treated with excess zinc powder (1.4 g.) for 1 hour at 50°C. The product was collected by vacuum filtration. A sample analyzed 0.17 percent soluble zinc, indicating substantially all of the chloride to be present as zinc chloride.

EXAMPLE VI

A 130 g. sample of mixed m- and p-tritolyl phosphite which contained 0.23 percent residual chloride was treated with an equivalent of zinc powder for 0.5 hour at 100°C. The product was collected by vacuum filtration. A sample analyzed 0.17 percent soluble zinc. With only an equivalent or stoichiometric amount of zinc, conversion of residual chloride to zinc chloride was somewhat less than complete.

EXAMPLE VII

A 130 g. sample of mixed m- and p-tritolyl phosphite which contained 0.23 percent residual chloride was treated with an equivalent of zinc powder in excess for 0.5 hour at 100°C. The product was collected by vacuum filtration. A sample analyzed 0.21 percent soluble zinc, indicating substantially all of the residual chloride to be present as zinc chloride.

EXAMPLE VIII

A 130 g. sample of mixed m- and p-tritolyl phosphite which contained 0.23 percent residual chloride was treated with 4 equivalents of zinc powder in excess for 0.5 hour at 100°C. The product was collected by vacuum filtration. A sample analyzed 0.22 percent soluble zinc. Residual chloride appears to have been completely converted to zinc chloride.

In additional experiments similar to those described in Examples IV to VIII, 100 g. samples of mixed m- and p-tritolyl phosphite containing 0.97 percent of residual chloride were treated for 2 hours at 110°C. respectively with 3 g. of titanium powder, 6 g. of cadmium powder and 3 g. of chromium powder. The titanium-treated sample changed color from greenish yellow to orange; the cadmium-treated sample showed 3 ppm of solubilized cadmium and the chromium-treated sample showed 39 ppm of solubilized chromium; indicating in each case reaction of the metal with residual chloride.

EXAMPLE IX

Phosphorus trichloride (60 g., 0.44 mole) was added from a dropping funnel over a 30 minute period to o-cresol (135.6 g., 1.25 mole) at 30°C. with stirring. The reaction mixture was then heated at 50°C. for 3 hours with nitrogen bubbling through the liquid at 40 ml/min. A sample of the product analyzed 9 percent o-cresol and 0.93 percent chloride. Excess zinc powder (3 g.) was added to the reactor, and the mixture was heated at 100°C. for 2 hours. The product was collected by vacuum filtration. The tritolyl phosphite mixture analyzed 6.6 percent o-cresol, 0.11 percent soluble zinc, and 0.12 percent chloride. Within experimental error, the chloride in the phosphite is accounted for as zinc chloride.

EXAMPLE X

This example illustrates the improved hydrocyanation results obtained in the use of a catalyst made from a triaryl phosphite by the process of this invention.

3-Pentenenitrile (3PN) was reacted with hydrogen cyanide using a zerovalent nickel catalyst prepared from mixed m- and p-tritolyl phosphite (TTP) containing 0.23 percent residual chloride for 5 hours at 60°C. The mole ratio $Ni°/ZnCl_2/TTP/3PN$ was 1/1.04/15.07/649. A total production of 67.9 mmoles of dinitriles was obtained with a consumption of 0.343 mmoles of Ni° catalyst, corresponding to a catalyst efficiency of 198 moles dinitriles/mole of Ni° charged.

For comparison, a sample of the mixed m- and p-tritolyl phosphite containing 0.23 percent residual chloride was treated with zinc powder as described in Example VIII. 3-Pentenenitrile was reacted with hydrogen cyanide using zero-valent nickel catalyst prepared from the zinc-treated m- and p-tritolyl phosphite for five hours at 60°C. The mole ratio $Ni°/ZnCl_2/TTP/3PN$ was 1/1.13/14.26/614. A total production of 143.1 mmoles of dinitriles was obtained with a consumption of 0.363 mmoles of Ni° catalyst, corresponding to a catalyst efficiency of 394 moles of dinitrile/mole Ni° charged. The advantage of using a catalyst made from triaryl phosphite prepared by the method of this invention is clearly evident.

I claim:

1. In a process for preparing an organic phosphorus compound of the formula $R_xP(OR')_{(3-x)}$ wherein R is an alkyl or aryl radical of 1 to 18 carbon atoms, R' is an aryl radical of 6–25 carbon atoms and $x$ has a value of 0–2 by maintaining a reaction mixture comprising a phenol and a phosphorus halide of the formula $R_xPX_{(3-x)}$, wherein X is a halide of the group consisting of chloride, bromide and iodide, and R and $x$ are as defined above, at a temperature in the range of about 25°C. to the boiling point of the resulting organic phosphorus compound;

the improvement which comprises incorporating into the reaction mixture when reaction of the phenol with the phosphorus halide is substantially complete at least a stoichiometric amount based on the resultant hydrogen halide in the reaction mixture of a metal selected from the class consisting of zinc, chromium, titanium, cadmium and mixtures thereof and maintaining the reaction mixture at a temperature in the range of 25°C. to the boiling point of the reaction medium for from 0.1 to 2 hours to produce an organic phosphorus compound free of hydrogen halide.

2. The process of claim 1 wherein upon addition of the metal the reaction mixture is maintained at a temperature in the range of 40° to 110°C.

3. The process of claim 2 wherein the aromatic phosphorus compound produced is a mixed meta- and para-tritolyl phosphite.

4. The process of claim 2 wherein the aromatic phosphorus compound produced is tri-o-tolyl phosphite.

5. The process of claim 2 wherein the metal is zinc.

6. The process of claim 4 wherein the metal is zinc.

* * * * *